(12) United States Patent
Gentils et al.

(10) Patent No.: US 11,742,640 B2
(45) Date of Patent: Aug. 29, 2023

(54) MEDIUM VOLTAGE ELECTRICAL APPARATUS TANK

(71) Applicant: Schneider Electric Industries SAS, Rueil Malmaison (FR)

(72) Inventors: François Gentils, Tullins (FR); Jean-Michel Bonfils, Grenoble (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 52 days.

(21) Appl. No.: 17/547,431

(22) Filed: Dec. 10, 2021

(65) Prior Publication Data
US 2022/0200251 A1 Jun. 23, 2022

(30) Foreign Application Priority Data
Dec. 23, 2020 (FR) ...................................... 2014059

(51) Int. Cl.
*H02B 13/045* (2006.01)
(52) U.S. Cl.
CPC .................................. *H02B 13/045* (2013.01)
(58) Field of Classification Search
CPC .................................................. H02B 13/045
See application file for complete search history.

(56) References Cited

U.S. PATENT DOCUMENTS

| | | | | |
|---|---|---|---|---|
| 5,250,752 A | * | 10/1993 | Cutright | H05K 7/183 312/263 |
| 5,639,150 A | * | 6/1997 | Anderson | H02B 1/308 312/265.5 |
| 5,806,945 A | * | 9/1998 | Anderson | H02B 1/308 312/265.5 |
| 9,166,384 B2 | * | 10/2015 | Kobayashi | H02B 13/02 |
| 2022/0361344 A1 | * | 11/2022 | Semrau | H05K 5/0004 |

FOREIGN PATENT DOCUMENTS

| | | | |
|---|---|---|---|
| CN | 1876308 A | | 12/2006 |
| CN | 203536845 U | | 4/2014 |
| CN | 203722117 U | * | 7/2014 |
| CN | 205051241 U | * | 2/2016 |
| CN | 206585262 U | | 10/2017 |
| EP | 3188331 A1 | | 7/2017 |
| FR | 3097383 A1 | | 12/2020 |

OTHER PUBLICATIONS

French Search Report and Written Opinion dated Sep. 23, 2021 for corresponding French Patent Application No. FR2014059, 13 pages.

* cited by examiner

*Primary Examiner* — Robert J Hoffberg
(74) *Attorney, Agent, or Firm* — Locke Lord LLP

(57) ABSTRACT

A tank for a medium-voltage electrical unit that is intended to contain a gas under a pressure greater than atmospheric pressure, the tank having:
  a structure that has uprights,
  panels that are secured to the uprights, the panels being set up to receive a pressure force of the pressurized gas,
  at least one metal reinforcing rod extending in a longitudinal direction, the reinforcing rod connecting together two uprights so as to counter a deformation of the uprights under the action of the pressure force of the gas,
  at least one first electrically insulating tube,
wherein at least one longitudinal portion of the reinforcing rod is surrounded by the first insulating tube, and wherein an inner surface of the first insulating tube is remote from a lateral surface of the reinforcing rod.

23 Claims, 6 Drawing Sheets

MEDIUM VOLTAGE ELECTRICAL APPARATUS TANK

TECHNICAL FIELD

The present invention relates to the field of tanks intended to contain medium-voltage electrical distribution units, that is to say voltages of between 1 and 52 kV. These tanks may contain for example arc extinguishing devices, such as switches, circuit breakers or disconnectors, which ensure the operation of a medium-voltage electrical distribution network.

PRIOR ART

A tank containing medium-voltage electrical equipment must ensure the electrical insulation of the electrical equipment from one another, and also with respect to the outside, and thus avoid the creation of electric arcs and electric discharges, also referred to as "streamers".

To this end, it is commonplace to fill the tank with a pressurized fluorinated gas, such as sulfur hexafluoride, which has satisfactory dielectric properties. However, this gas also has a high global warming power. It is thus possible instead to use gases with a low warming potential, such as air, nitrogen or carbon dioxide. These gases have a lower dielectric strength than the gas that is to be replaced. In order to keep the same performance in terms of electrical insulation, the gas pressure inside the chamber must be more than two times higher.

The mechanical stresses transmitted to the structure of the tank via the pressure being applied to the panels of the tank increase under the effect of the increased pressure of the gas in the tank. In order to prevent this structure from deforming, it is thus necessary to reinforce it. One possibility is to increase the thickness of the panels and/or of the structure. This solution has the drawback of significantly increasing the cost price of the tank.

Another possibility may be to have a robust framework of the structure that is made up of uprights and to add metal reinforcers that connect together the uprights. In this case, it is difficult to guarantee the insulation of these reinforcers, and to prevent the formation of electric arcs between the reinforcers and the electrical units in the tank.

It is known to electrically insulate such metal reinforcers from the live elements in the tank using an electrical insulator made of plastics material, such as elastomer, but this solution is expensive. It is also known to electrically insulate these metal reinforcers by overmoulding them with a thermosetting resin. However, expansion causes fatigue in the insulating material and therefore poses the risk that the interface with the metal reinforcer degrades.

There is thus a need to provide a tank that has improved mechanical strength on the basis of metal reinforcing rods, and has an excess cost lower than and improved electrical insulation performance over the known solutions of the prior art.

SUMMARY

To that end, the invention proposes a tank for a medium-voltage electrical unit that is intended to contain a gas under a pressure greater than atmospheric pressure, said tank having:
- a structure that has uprights,
- panels that are secured to the uprights, the panels being set up to receive a pressure force of the pressurized gas,
- at least one metal reinforcing rod extending in a longitudinal direction, the reinforcing rod connecting together two uprights so as to counter a deformation of the uprights under the action of the pressure force of the gas,
- at least one first electrically insulating tube,
wherein at least one longitudinal portion of the reinforcing rod is surrounded by the first insulating tube.

The reinforcing rods stiffen the structure and prevent it from deforming under the effect of the pressure of the pressurized gas that is exerted on the panels. By surrounding the metal reinforcing rod with an insulating tube, the insulation of the reinforcing rod is improved and the risk of creating an electric arc between the reinforcing rod and an electrical unit disposed in the tank is eliminated. The solution proposed thus provides a mechanical strength that is compatible with the pressures employed in the tank, while guaranteeing satisfactory electrical insulation. The extra cost involved is small and has little effect on the process for manufacturing the tank.

The features listed in the following paragraphs may be implemented independently of one another or in any technically possible combination:

The gas that the tank is intended to contain may be a pure gas or a gaseous mixture. The gas that the tank is intended to contain may be in particular a binary mixture.

The reinforcing rod and the first insulating tube are coaxial.

The first insulating tube is disposed between the two uprights in the longitudinal direction.

An inner surface of the first insulating tube is remote from a lateral surface of the reinforcing rod.

An inner surface of the first insulating tube is separated from the lateral surface of the reinforcing rod by the pressurized gas.

The reinforcing rod and the first insulating tube are set up such that a pressure of the gas inside the insulating tube is equal to a pressure of the gas outside the insulating tube 5.

The insulating tube is thus not subjected to forces that tend to make it deform.

The first insulating tube is filled with an insulating foam.

The reinforcing rod is rectilinear.

The reinforcing rod is cylindrical.

The diameter of the reinforcing rod is between 6 and 20 millimetres.

According to one implementation variant, the reinforcing rod is a threaded rod.

The reinforcing rod is thus a routine procurement, and it becomes easier to secure it.

The first insulating tube is cylindrical.

The first insulating tube is made of polypropylene, or any other electrically insulating thermosetting, thermoplastic or ceramic material.

This material affords good electrical insulation properties.

An external diameter of the first insulating tube is between 10 and 24 millimetres.

A thickness of the first insulating tube is between 1 and 6 millimetres.

A length of the first insulating tube is greater than 80% of a total length of the reinforcing rod.

According to one embodiment, a ratio between the diameter of the reinforcing rod and the external diameter of the first insulating tube is between 0.1 and 0.6.

According to one embodiment, the tank comprises a second insulating tube, and the second insulating tube surrounds the first insulating tube.

The second insulating tube and the first insulating tube are coaxial.

An external diameter of the second insulating tube is between 14 and 40 millimetres.

An inner surface of the second insulating tube is remote from an outer surface of the first insulating tube.

An inner surface of the second insulating tube is separated from the outer surface of the first insulating tube by a layer of pressurized gas.

The tank has a spacer set up to hold the insulating tube in place coaxially with the reinforcing rod.

According to one implementation variant, the tank has a spacer set up to hold the first insulating tube in place coaxially with the reinforcing rod and to hold the second insulating tube in place coaxially with the reinforcing rod.

The spacer has a through-slot that receives the reinforcing rod.

The spacer has a receiving area incorporated at least partially in the first insulating tube.

The spacer is disposed at an axial end of the first insulating tube.

The spacer is disposed at an axial end of the second insulating tube.

The spacer is in the form of a stepped cylindrical ring.

One axial end of the first insulating tube is in contact with a step of the spacer.

An inner surface of the stepped ring is in contact with the reinforcing rod and an outer surface of the ring is in contact with an inner surface of the insulating tube.

The spacer has a circular groove, one axial end of the first insulating tube being received in the circular groove.

A first spacer and a second spacer are disposed in each case at one axial end of the first insulating tube.

The spacer is made of polypropylene, or any other electrically insulating thermosetting, thermoplastic or ceramic material. The spacer may optionally be made of metal, depending on the dielectric conditions of the tank.

The spacer is set up to allow the pressurized gas to pass between the outside and the inside of the first insulating tube.

The reinforcing rod extends transversely in relation to the uprights.

The reinforcing rod is perpendicular to the uprights.

The tank comprises at least two opposite flat faces, the reinforcing rod extends between the uprights that are secured to the two opposite flat faces of the tank.

The reinforcing rod connects the uprights that are secured to the larger panels of the tank.

The tank comprises two parallel uprights defining a plane that is perpendicular to at least one panel, and comprises two mutually parallel reinforcing rods that extend perpendicularly in relation to the two uprights. It is thus understood that the tank comprises at least two parallel uprights. The tank may comprise a greater number of uprights, depending on the number and type of electrical equipment that the tank contains.

According to one embodiment, the first insulating tube is surrounded by a disc-shaped splitter.

According to another embodiment, one axial end of the first insulating tube is in contact with a disc-shaped splitter.

According to an exemplary implementation of the invention, each axial end of the first insulating tube is in contact with a disc-shaped splitter.

The splitter is electrically insulating.

The splitter is made of polypropylene or any other electrically insulating thermosetting, thermoplastic or ceramic material.

The splitter and the first insulating tube are coaxial.

The splitter extends radially in a plane inclined with respect to a longitudinal axis of the first insulating tube. The splitter may extend in a plane that is perpendicular to a longitudinal axis of the first insulating tube.

An area of contact between the first insulating tube and the splitter extends continuously over 360°.

An external diameter of the splitter is between 15 and 150 millimetres.

According to one embodiment, the spacer and the splitter form a one-piece assembly.

The first insulating tube is surrounded by a splitter at each of its ends.

The splitter is adjacent to the upright.

The distance between the splitter and the upright is between 1 and 30 millimetres.

According to one embodiment, the second insulating tube is surrounded by a disc-shaped splitter.

One axial end of the second insulating tube is in contact with a disc-shaped splitter.

The reinforcing rod is connected to the uprights of the structure by nuts.

According to one embodiment, the connection between the reinforcing rod and the upright of the structure has a locknut, the upright being pressed between the nut and the locknut.

The reinforcing rod is secured to the uprights by rivets.

The reinforcing rod is secured to the uprights by elastically locking connection elements.

The uprights are metal profiles.

The uprights are U-shaped profiles.

The nut connecting the upright and the reinforcing rod is housed between the legs of the U.

The nut connecting the upright and the reinforcing rod bears against the base of the U.

According to one embodiment of the tank, a first pair of opposite uprights are connected by at least two reinforcing rods and a second pair of opposite uprights are connected by at least two reinforcing rods.

The at least two reinforcing rods are parallel.

The tank has three separate compartments, the reinforcing rods of the first pair of uprights and the reinforcing rods of the second pair of uprights are included in a plane that delimits a separation between two consecutive compartments.

BRIEF DESCRIPTION OF THE DRAWINGS

Other features, details and advantages will become apparent from reading the description provided below and from examining the appended drawings, in which.

DETAILED DESCRIPTION OF EMBODIMENTS

In order to make it easier to read the figures, the various elements are not necessarily shown to scale. In the figures, the elements that are identical bear the same references. Certain elements or parameters may be indexed, that is to say denoted for example by "first element" or "second element", or else "first parameter" and "second parameter", etc. The aim of this indexing is to differentiate between elements or parameters that are similar but not identical. This indexing does not imply that one element or parameter takes priority over another; it is possible to interchange the denominations. When it is specified that a subsystem has a given element, it does not exclude the presence of other elements in this subsystem.

Figure 1:
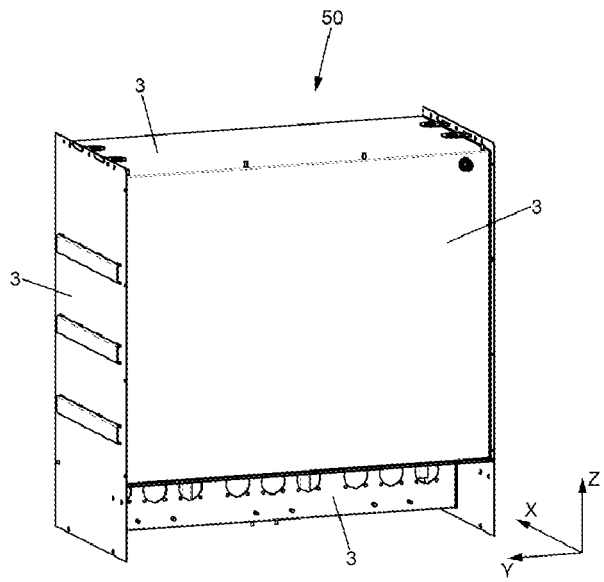
FIG. 1 is a general perspective view of a tank for a medium-voltage electrical unit according to the invention.
Figure 2:
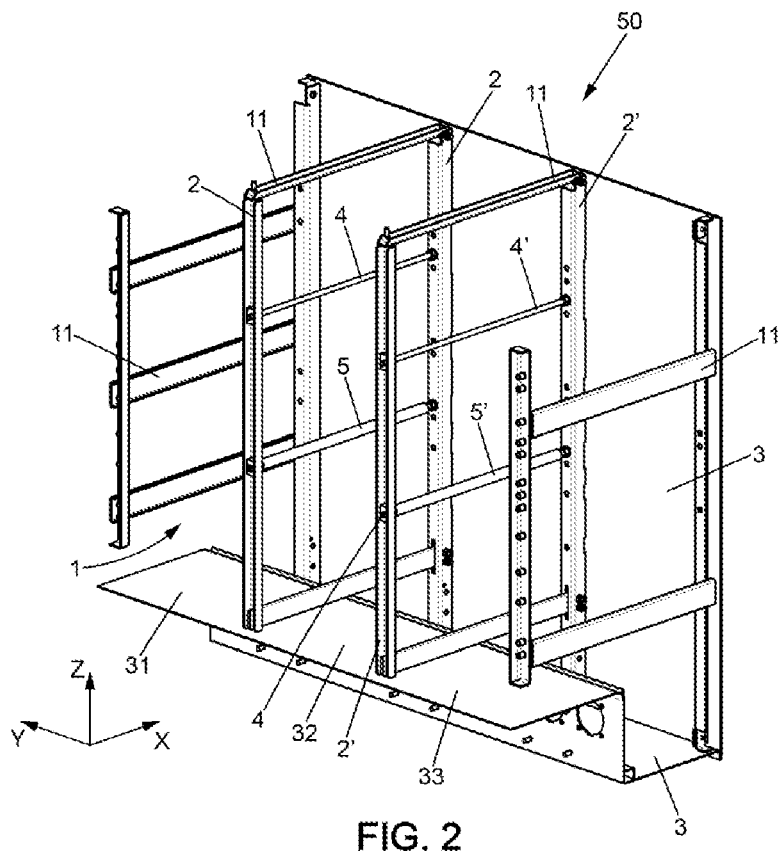
FIG. 2 is a partial view of the tank of FIG. 1.

Shown in FIG. 1 and FIG. 2 is a tank 50 for a medium-voltage electrical unit that is intended to contain a gas under a pressure greater than atmospheric pressure, said tank having:

a structure 1 that has uprights 2,
panels 3 that are secured to the uprights 2, the panels 3 being set up to receive a pressure force of the pressurized gas.

The assembly of the uprights 2 forms part of a structure 1 to which the panels 3 are secured. The panels 3 form the outer shell of the tank 50. In this instance, the panels 3 are welded to the structure 1. In the example illustrated here, the tank 50 has the general shape of a rectangular parallelepiped. The tank 50 delimits a closed volume that is delimited by the panels 3. The volume defined by the panels 3 is gas-tight. The uprights 2 extend in a first direction Z, which corresponds to the vertical direction. The uprights 2 are connected at each of their ends by the tie rods 11, or stiffeners 11, that extend in a second direction X, which is transverse to the first direction Z and corresponds to a first horizontal direction. A pair of uprights 2 and a pair of stiffeners 11 form a rectangular frame. A panel 3 may be secured to each side of the rectangular frame. A plurality of rectangular frames are disposed in the third direction Y, which corresponds to the second horizontal direction and is perpendicular to the first horizontal direction X. The structure 1 comprises the assembly of uprights 2 and stiffeners 11.

The tank 50 may thus contain a pressurized gas, that is to say a gas at a pressure greater than atmospheric pressure. The gas that the tank is intended to contain may be a pure gas or a gaseous mixture. The gas that the tank is intended to contain may be in particular a binary mixture. The gas may be for example dry or dehumidified air, a mixture of nitrogen, oxygen and carbon dioxide, or any other gas or mixture with adequate electrical insulation properties. The interior space of the tank 50 is intended to receive medium-voltage electrical distribution units. The term "medium-voltage" is understood to mean voltages of between 1 kilovolt (kV) and 52 kilovolts. The units may be for example arc extinguishing devices, such as switches, fuse switches, circuit breakers or disconnectors. Under nominal operating conditions, the electrical units are in contact with the pressurized gas. The inner face of the panels 3 is also in contact with the pressurized gas. The outer face of the panels 3 is subjected to the effect of atmospheric pressure. The forces generated by the difference in pressure between the inside and the outside of the tank 50 thus tend to cause the panels to move away from one another. The forces applied to the panels are transmitted to the structure 1, in particular to the uprights 2, and tend to cause them to sag.

The tank 50 also has:

at least one metal reinforcing rod 4 extending in a longitudinal direction X, the reinforcing rod 4 connecting together two uprights 2 so as to counter a deformation of the uprights 2 under the action of the pressure force of the gas, at least one first electrically insulating tube 5, wherein at least one longitudinal portion of the reinforcing rod 4 is surrounded by the first insulating tube 5.

The reinforcing rod 4 makes it possible to stiffen the structure 1 by limiting the bending of the uprights 2 under the effect of the pressure exerted on the panels 3. By surrounding the metal reinforcing rod 4 with an insulating tube 5, the electrical insulation of the reinforcing rod 4 is improved. The risk of creating an electric arc between the reinforcing rod 4 and an electrical unit disposed in the tank 50 is eliminated. The solution proposed thus provides a mechanical strength that is compatible with the pressures employed in the tank, while guaranteeing satisfactory electrical insulation. The extra cost involved is small and has little effect on the process for manufacturing the tank. A tank initially designed to be filled with pressurized fluorinated gas may therefore be adapted to operate with a non-fluorinated gas, such as air or nitrogen, which requires greater pressure, with a limited number of modifications.

Over at least part of its length, the reinforcing rod 4 is disposed inside the first insulating tube 5. The ends of the reinforcing rod 4 are outside the volume delimited by the first insulating tube 5.

The longitudinal portion surrounded by the first insulating tube 5 is disposed between the two uprights 2. The reinforcing rod 4 comprises a longitudinally central portion 25 and two end portions 26, 27 that are located on either side of the central portion. Each upright 2 is disposed between the central portion 25 and a portion of the respective end.

Figure 8:
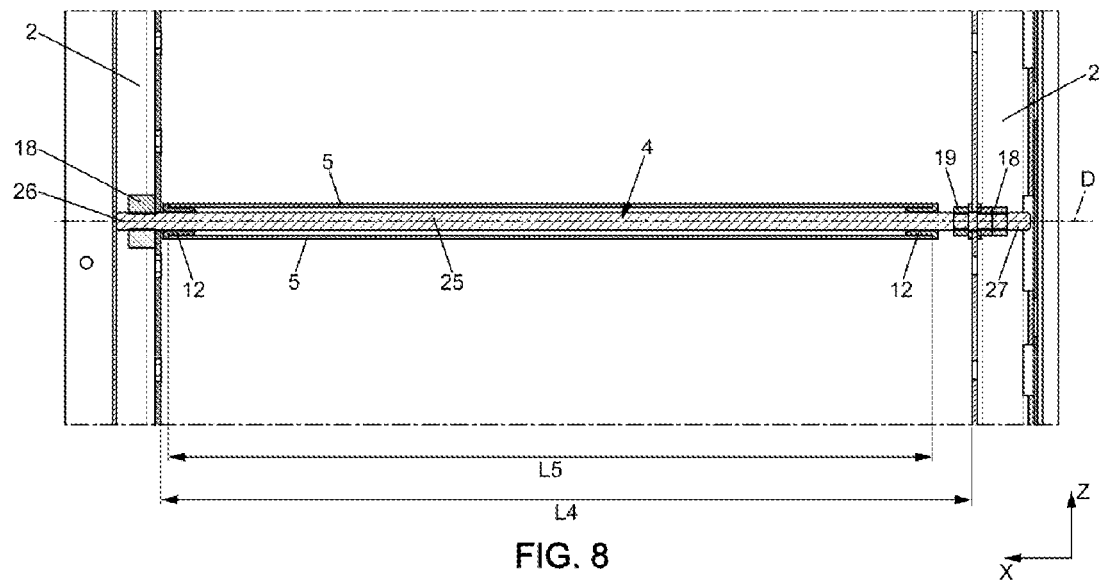
FIG. 8 is a sectional detail view of the first embodiment of FIG. 4.
Figure 9:
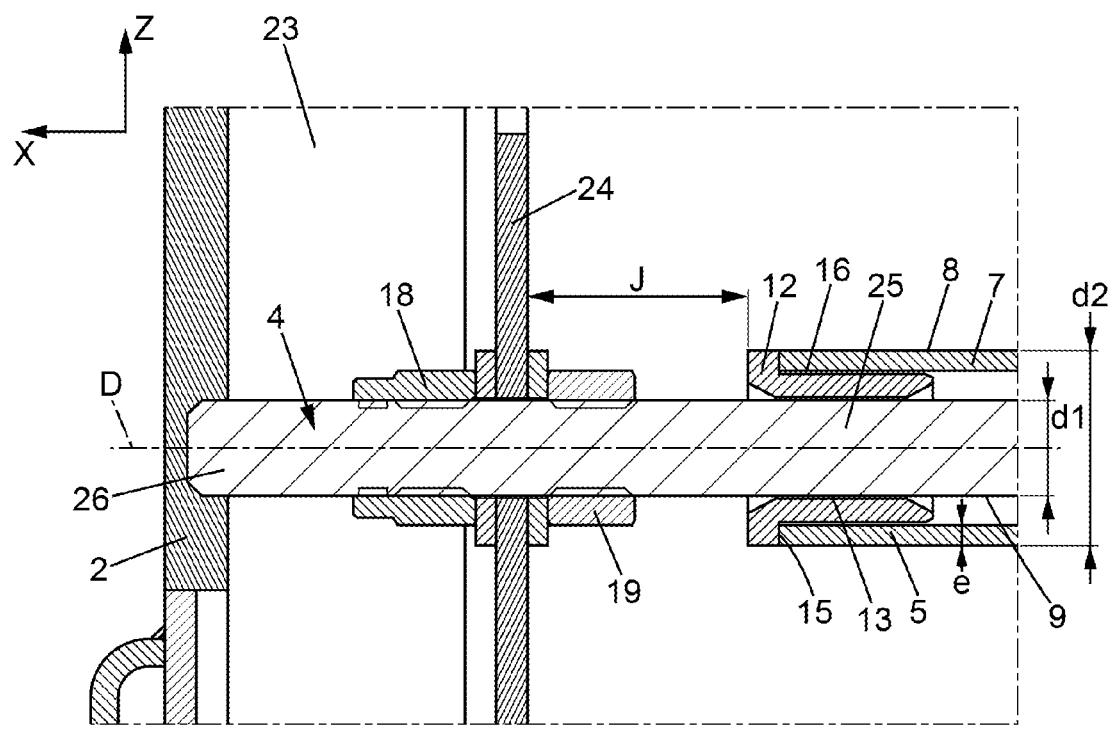
FIG. 9 is another sectional detail view of a variant of the first embodiment of FIG. 4.

As shown in detail in FIG. 8 and FIG. 9, the reinforcing rod 4 and the first insulating tube 5 are coaxial. The reinforcing rod 4 and the first insulating tube 5 extend along a common axis D. D is parallel to the longitudinal direction X.

The first insulating tube 5 is disposed between the two uprights 2 in the longitudinal direction X.

An inner surface 7 of the first insulating tube 5 is remote from a lateral surface 9 of the reinforcing rod 4. Expressed differently, there is a radial clearance between the reinforcing rod 4 and the first insulating tube 5. Having a radial clearance makes it possible to reduce the electric field at the outer surface 8 of the insulating tube 5. The risk of an electric discharge propagating over the outer surface 8 of the insulating tube 5 is thus reduced.

According to the example illustrated, in particular in FIG. 9, an inner surface 7 of the first insulating tube 5 faces the reinforcing rod 4. More specifically, an inner surface 7 of the first insulating tube 5 is separated from the lateral surface 9 of the reinforcing rod 4 by the pressurized gas.

The reinforcing rod 4 and the first insulating tube 5 are set up such that a pressure of the gas inside the first insulating tube 5 is equal to a pressure of the gas outside the insulating tube 5.

According to one embodiment, which is not shown, the first insulating tube 5 is filled with an insulating foam. The insulating foam may be for example polyurethane, epoxy, or silicone. Expressed differently, the radial space between the first insulating tube 5 and the reinforcing rod 4 is filled with an insulating foam. The insulating foam is in contact with the reinforcing rod 4 and with the inner surface of the first insulating tube.

The reinforcing rod 4 is rectilinear. The reinforcing rod 4 is cylindrical. The diameter d1 of the reinforcing rod 4 is between 6 and 20 millimetres.

The reinforcing rod 4 is connected to the uprights 2 of the structure 1 by nuts 18. A nut 18 is disposed at each of the ends 25, 26 of the reinforcing rod 4.

Figure 3:
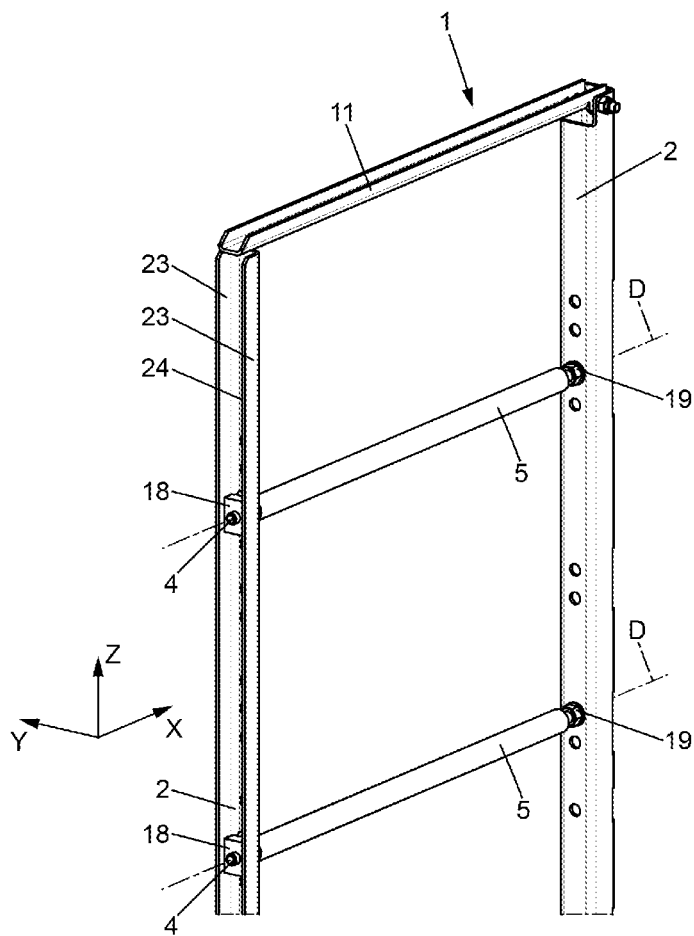
FIG. 3 is a detail view illustrating two uprights of the tank that are fitted with at least one reinforcing rod.

As shown in detail in FIG. 8 and in FIG. 3, the connection between the reinforcing rod 4 and the upright 2 of the structure 1 has a locknut 19, the upright 2 being pressed between the nut 18 and the locknut 19. The effect of the pressure force that acts on the panels 3 and is transmitted to the uprights causes the reinforcing rod 4 to work in elongation.

As shown in detail in FIG. 3, the uprights 2 are metal profiles. In the example described here, the uprights 2 are U-shaped profiles. This is understood to mean that a transverse section of the profile has a U shape. Therefore, the uprights 2 have two legs 23, parallel to and facing one another, that are connected to one another by a base 24. The nut 18 connecting the upright 2 and the reinforcing rod 4 is housed between the legs 23 of the U. The nut 18 connecting the upright 2 and the reinforcing rod 4 bears against the base 24 of the U. A first pair of opposite uprights 2 are connected by at least two reinforcing rods 4 and a second pair of opposite uprights 2' are connected by at least two reinforcing rods 4'. The at least two reinforcing rods 4, 4' are parallel.

In the example illustrated, and shown in FIG. 2, the tank 50 comprises three compartments 31, 32, 33. The reinforcing rods 4 of the first pair of uprights 2 and the reinforcing rods 4' of the second pair of uprights 2' are included in a plane that delimits two consecutive compartments. "Consecutive compartments" are understood to mean neighbouring compartments, that is to say compartments that are next to one another. The reinforcing rods 4 of the first pair of uprights 2 delimit the first compartment 31 with respect to the second compartment 32. The reinforcing rods 4' of the second pair of uprights 2' delimit the second compartment 32 with respect to the third compartment 33. Electrical units, which are not shown, are disposed in the various compartments 31, 32, 33.

The reinforcing rod 4 extends transversely in relation to the uprights 2. In the example shown in FIG. 2 and FIG. 3, the reinforcing rod 4 is perpendicular to the uprights 2.

The tank 50 comprises at least two opposite flat faces, the reinforcing rod 4 extends between the uprights 2 that are secured to the two opposite flat faces of the tank. The reinforcing rod connects the uprights 2 that are secured to the larger panels 3 of the tank 50. The lateral panels and the front panel have not been shown in FIG. 2, in order that the structure 1 of the tank 50 can be seen.

The tank 50 comprises two parallel uprights 2 defining a plane that is perpendicular to at least one panel 3, and comprises two mutually parallel reinforcing rods 4 that extend perpendicularly in relation to the two uprights 2. The first insulating tube surrounding the upper reinforcing rod has not been shown in FIG. 2, in order that the reinforcing rod 4 can be seen. The first insulating tube 5 is shown on the lower reinforcing rod, which means that only the end portion of the lower reinforcing rod 4 projecting beyond the upright 2 is visible.

According to one implementation variant, the reinforcing rod 4 is a threaded rod. Expressed differently, the reinforcing rod 4 is threaded over its entire length. According to another variant, the reinforcing rod 4 is threaded at a first end portion 26 and at a second end portion 27, and is smooth at a central portion 25 between the two end portions 26, 27. More particularly, the portion of the reinforcing rod 4 that faces the first insulating tube 4 may be smooth. Expressed differently: the portion of the reinforcing rod 4 that is surrounded by the first insulating tube 5 may be smooth.

The first insulating tube 5 is cylindrical. In this instance, the first insulating tube 5 is made of polypropylene. The first insulating tube 5 may also be made of a thermosetting, thermoplastic or ceramic insulating material. These materials give good electrical insulation properties.

An external diameter d2 of the first insulating tube 5 is between 10 and 24 millimetres. A thickness e of the first insulating tube 5 is between 1 and 6 millimetres.

Figure 11:
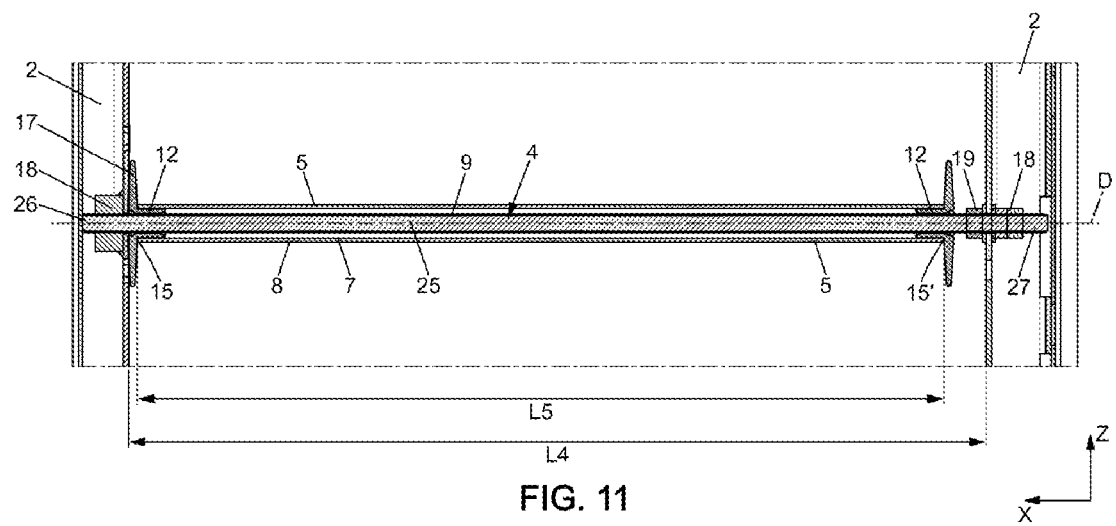
FIG. 11 is a sectional detail view of the third embodiment of FIG. 6.

As shown in FIG. 8 and in FIG. 11, a length L5 of the first insulating tube 5 is greater than 80% of a distance L4 between the 2 uprights.

A ratio between the diameter d1 of the reinforcing rod 4 and the external diameter d2 of the first insulating tube 5 is between 0.1 and 0.6.

Figure 4:
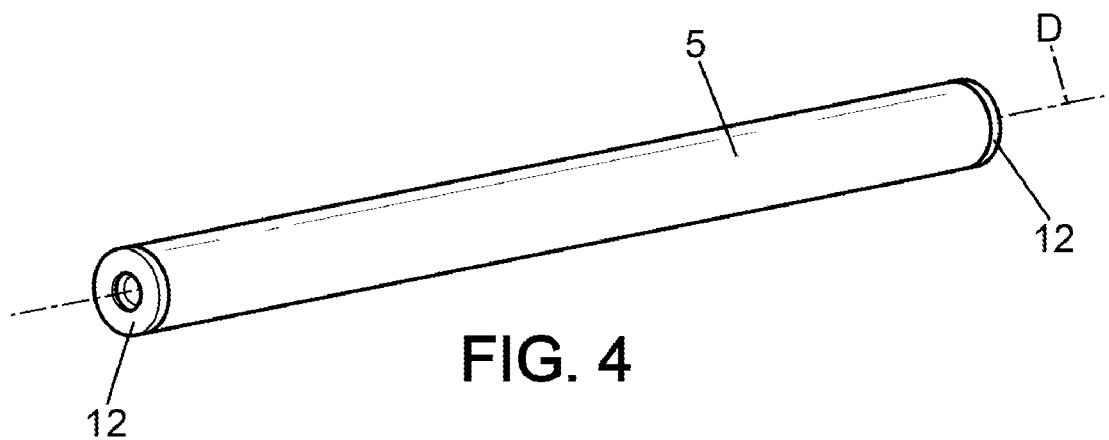
FIG. 4 is a perspective detail view of a first embodiment of the invention.
Figure 5:
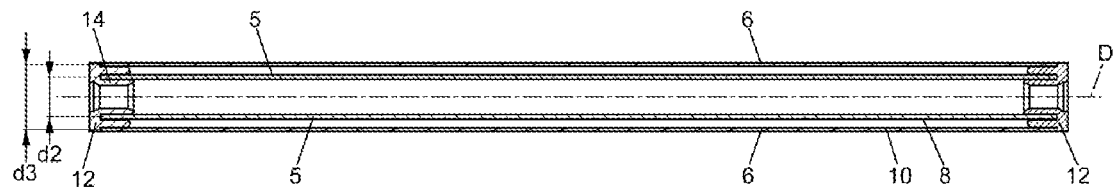
FIG. 5 is a sectional detail view of a second embodiment of the invention.

According to a second embodiment, which is illustrated in FIG. 5, the tank 50 comprises a second insulating tube 6, and the second insulating tube 6 surrounds the first insulating tube 5. The reinforcing rod 4 has not been shown in FIGS. 4, 5 and 7. Expressed differently, the second embodiment differs from the first embodiment by the addition of a second insulating tube. This avoids the appearance of an electric arc or discharge between the surface of the second insulating tube 6 and the reinforcing rod 4.

In the example shown in FIG. 5, the second insulating tube 6 and the first insulating tube 5 are coaxial. Expressed differently, the first insulating tube 5 is disposed inside the second insulating tube 6. The second insulating tube 6 surrounds the first insulating tube 5 over the entire length of the first insulating tube 5. In the example shown in FIG. 5, the second insulating tube 6 and the first insulating tube 5 have the same length.

An external diameter D3 of the second insulating tube 6 is between 14 and 40 millimetres.

An inner surface 10 of the second insulating tube 6 is remote from an outer surface 8 of the first insulating tube 5. Expressed differently, there is a radial clearance between the first insulating tube 5 and the second insulating tube 6. This radial clearance makes it possible to reduce the electrical field even further.

The inner surface 10 of the second insulating tube 6 is separated from the outer surface 8 of the first insulating tube 5 by a layer of pressurized gas. The pressure inside the first insulating tube 5 and the pressure inside the second insulating tube 6 are identical. This pressure is equal to the pressure inside the tank.

The tank 50 has a spacer 12 set up to hold the first insulating tube 5 in place coaxially with the reinforcing rod 4.

The spacer 12 has a through-slot 13 that receives the reinforcing rod 4. The reinforcing rod 4 passes through the spacer 12 in the longitudinal direction X, which is also the direction of the axis D of the insulating tube 5.

The spacer 12 has a receiving area incorporated at least partially in the first insulating tube 5. A portion of the spacer 12 is thus interposed radially between the reinforcing rod 4 and the first insulating tube 5. The spacer 12 thus holds the tube 5 in place.

The spacer 12 is made of polypropylene. The spacer 12 may also be made of any other electrically insulating thermosetting, thermoplastic or ceramic material or of metal.

The spacer 12 is set up to allow the pressurized gas to pass between the outside and the inside of the insulating tube 5. Expressed differently, the spacer 12 does not ensure a sealed closure of the first insulating tube 5.

In the second embodiment, which is shown in FIG. 5, the tank 50 has a spacer 12 set up to hold the first insulating tube 5 in place coaxially with the reinforcing rod 4 and to hold the second insulating tube 6 in place coaxially with the reinforcing rod 4. At each end, a single spacer 12 holds the first insulating tube 5 and the second insulating tube 6 in place. Expressed differently, at each end the same spacer holds the first insulating tube 5 and the second insulating tube 6 in place.

The spacer 12 is disposed at an axial end of the first insulating tube 5. In the second and the fourth embodiment, in which a second insulating tube 6 surrounds the first insulating tube 5, a spacer 12 is disposed at an axial end of the second insulating tube 6. More specifically, a spacer 12 is disposed at each axial end of the second insulating tube 6.

Figure 10:
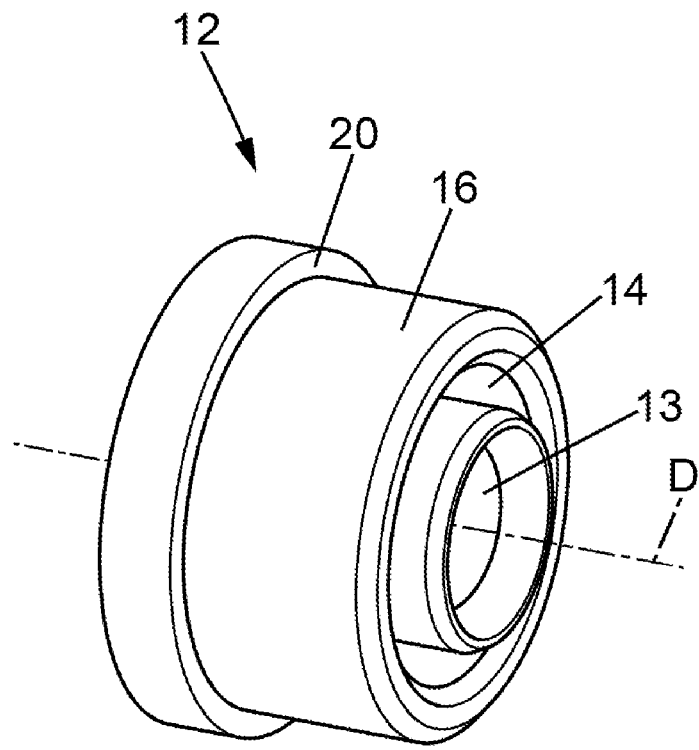
FIG. 10 is a perspective detail view of a spacer of the second embodiment of FIG. 5.

More particularly, FIG. 10 shows in detail the spacer 12 of the second embodiment. The spacer 12 is in the form of a stepped cylindrical ring. One axial end 28 of the second insulating tube 6 is in contact with a step 20 of the spacer 12.

As is shown in particular in FIG. 9, an inner surface of the stepped ring is in contact with the reinforcing rod 4 and an outer surface 16 of the ring is in contact with an inner surface 7 of the insulating tube 5.

Figure 12:
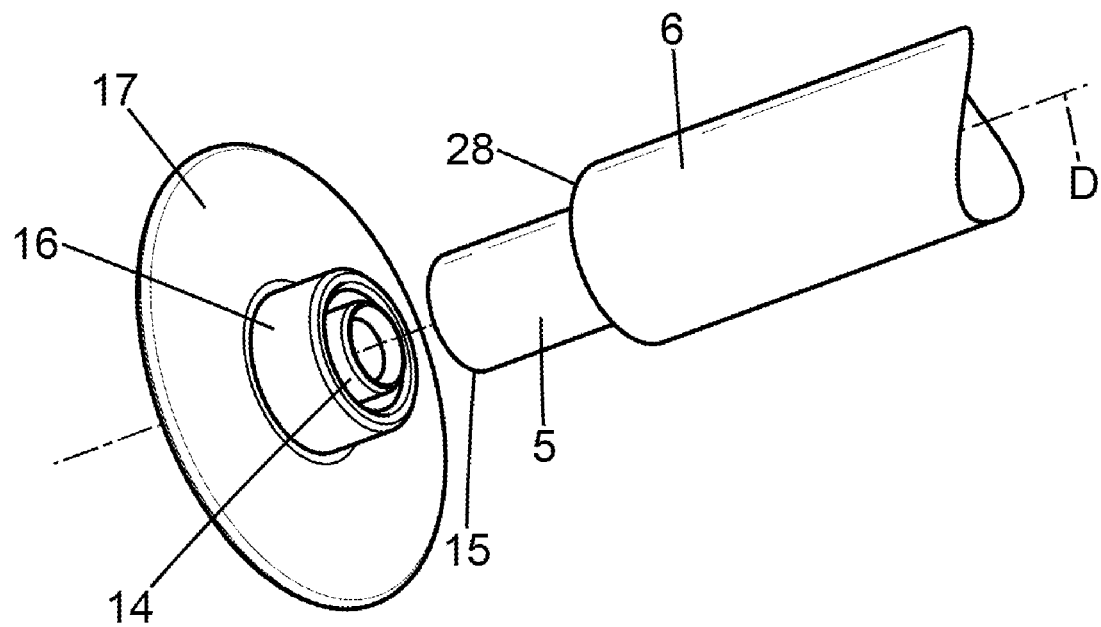
FIG. 12 is a perspective detail view of the fourth embodiment of FIG. 7.

In the second embodiment and the fourth embodiment, which comprise two insulating tubes 5, 6 as described above, the spacer 12 has a circular groove 14, one axial end 15 of the first insulating tube 5 being received in the circular groove 14. FIG. 12 shows this feature. In these embodiments, the second insulating tube 6 is held in place by the spacer 12 in the same way as the first insulating tube 5 in the first and the third embodiment.

A first spacer 12 and a second spacer 12' are disposed in each case at one axial end 15, 15' of the insulating tube 5.

According to one feature of the invention, there is an axial clearance J between a spacer 12 and the upright 2 through which the corresponding axial end of the reinforcing rod passes.

The third embodiment and the fifth embodiment differ from the first embodiment by the addition of a splitter 17 on the first insulating tube 5, or in its immediate vicinity. The fourth embodiment differs from the second embodiment by the addition of a splitter 17 on the second insulating tube 6.

The splitter 17 is electrically insulating. The splitter 17 is for example made of polypropylene, or any other electrically insulating thermosetting, thermoplastic, elastomeric or ceramic material. The splitter 17 and the insulating tube 5 are coaxial. The splitter 17 extends radially in a plane inclined with respect to a longitudinal axis D of the first insulating tube 5. In the example illustrated, the splitter 17 extends radially in a plane that is perpendicular to the longitudinal axis D of the first insulating tube 5. An external diameter D4 of the splitter 17 is between 15 and 150 millimetres. The splitter 17 makes it possible to improve the electrical insulation of the subassembly formed by the reinforcing rod 4, the spacers 12 and the insulating tube(s) 5, 6. This is because the presence of the splitter 17 lengthens the trajectory that a possible electric arc or electric discharge must cross in order to pass from an electrical component at an electrical potential of the electrical unit that is in the tank 50 to any element of the tank at the ground, by propagating along the outside of the insulating tube furthest away from the reinforcing rod 4.

Figure 6:
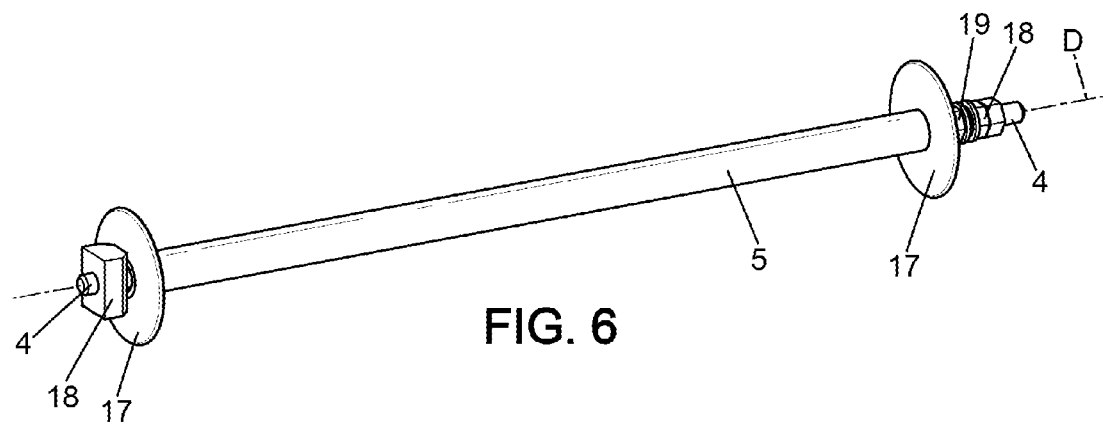
FIG. 6 is a perspective detail view of a third embodiment of the invention.

As illustrated in FIGS. 6 and 12, for the third and the fourth embodiment, one axial end 15 of the first insulating tube 5 is in contact with a disc-shaped splitter 17. More specifically, each axial end 15, 15' of the first insulating tube 5 is in contact with a disc-shaped splitter 17.

Figure 7:
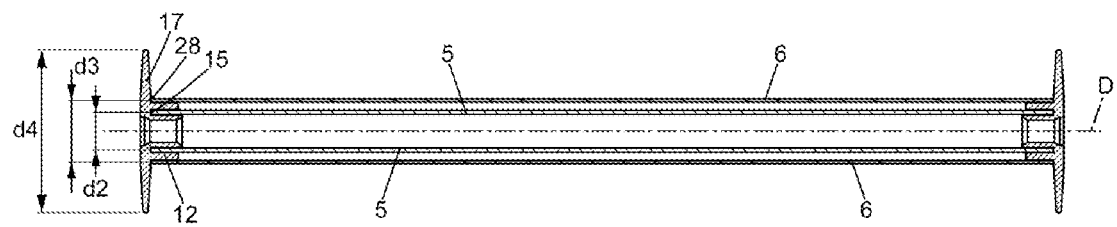
FIG. 7 is a sectional detail view of a fourth embodiment of the invention.

As illustrated in FIG. 7 and FIG. 12, one axial end 28 of the second insulating tube 6 is in contact with a disc-shaped splitter 17.

According to the example illustrated in particular in FIGS. 6 and 12, the spacer 12 and the splitter 17 form a one-piece assembly. The assembly may be obtained by plastic injection moulding. The splitters may comprise protuberances, which are not shown, aiming to lengthen the trajectory of the leakage path that an electric arc must travel.

Figure 13:
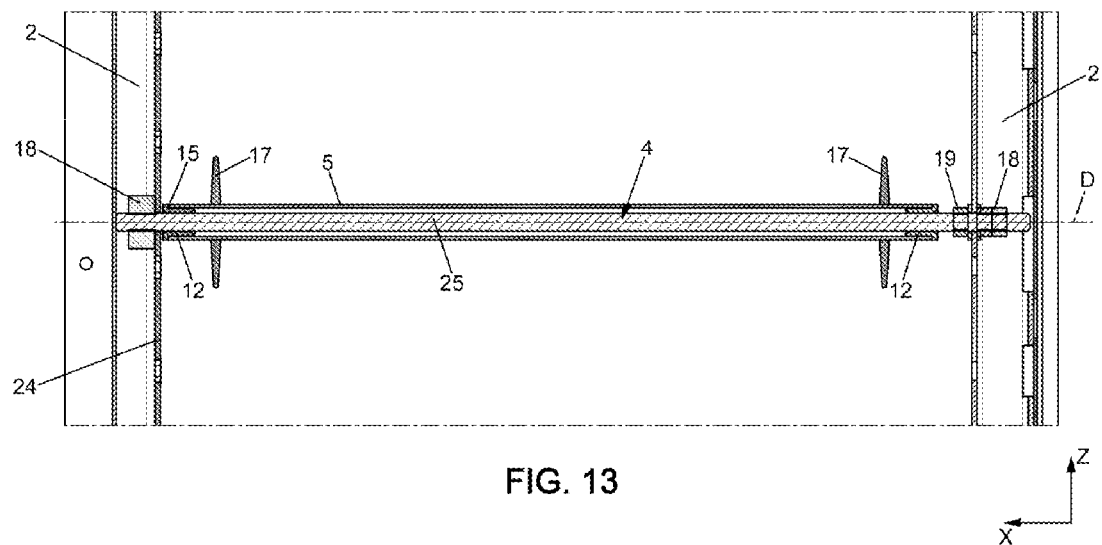
FIG. 13 is a sectional detail view of a fifth embodiment.

According to a fifth embodiment, shown in FIG. 13, the first insulating tube 5 is surrounded by a disc-shaped insulating splitter 17. Expressed differently, a portion of the first insulating tube 5 extends in the longitudinal direction X on either side of the insulating splitter 17.

The insulating splitter 17 is remote from the axial end 15 of the first insulating tube 5. An area of contact between the outer surface of the first insulating tube 5 and the splitter 17 extends continuously over 360°. Moreover, the area of contact between the first insulating tube 5 and the splitter 17 is leaktight. The insulating splitter 17 may form an integral part of the insulating tube, for example. Expressed differently, the insulating splitter and the insulating tube may form a one-piece assembly. The insulating splitter 17 may also be attached to the periphery of the first insulating tube 5.

The insulating tube 5 is surrounded by a splitter 17 in the vicinity of each of its ends. Additional similar splitters may be added along the insulating tube.

According to the third embodiment shown in FIG. 11, a splitter 17 is adjacent to the upright 2. The distance between the splitter 17 and the upright 2 is between 1 and 30 millimetres.

According to embodiments, which are not shown:
the second insulating tube 6 may be surrounded by a disc-shaped splitter 17. This embodiment is analogous to the fifth embodiment, and the splitter 17 surrounds the tube furthest away from the rod 4, consequently the second insulating tube 6.
The reinforcing rod 4 may be secured to the uprights by rivets.
The reinforcing rod 4 may be secured to the uprights by elastically locking connection elements.
When the space that is situated radially between the first insulating tube 5 and the reinforcing rod 4 is filled with insulating foam, the first insulating tube 5 may be kept at a distance from the reinforcing rod 4 by the insulating foam.
The tank 50 may have two compartments delimited by one or more reinforcing rods. The tank 50 may also have more than three compartments, delimited by one or more reinforcing rods.

The invention claimed is:

1. A tank for a medium-voltage electrical unit that is intended to contain a gas under a pressure greater than atmospheric pressure, the tank comprising:
a structure that has uprights,
panels that are secured to the uprights, the panels being set up to receive a pressure force of the pressurized gas, at least one metal reinforcing rod, each of the at least one metal reinforcing rod extending in a longitudinal direction, the at least one metal reinforcing rod connecting together two of the uprights so as to counter a deformation of the uprights under the action of the pressure force of the pressurized gas, at least one electrically insulating tube, wherein at least one longitudinal portion of each of the at least one metal reinforcing rod is surrounded by a corresponding one of the at least one electrically insulating tube, and wherein a lateral surface of each of the at least one metal reinforcing rod is separated from an inner surface of the corresponding one of the at least one electrically insulating tube.

2. The tank according to claim 1, wherein each of the at least one metal reinforcing rod and the corresponding one of the at least one electrically insulating tube are coaxial.

3. The tank according to claim 1, wherein each of the at least one electrically insulating tube is disposed between the two of the uprights in the longitudinal direction.

4. The tank according to claim 1, wherein the tank is set up such that each of the at least one metal reinforcing rod is separated from the inner surface of first the corresponding one of the at least one electrically insulating tube by the pressurized gas.

5. The tank according to claim 1, wherein the tank is set up such that the lateral surface of each of the at least one metal reinforcing rod is separated from the inner surface of the corresponding one of at least one electrically insulating tube by an insulating foam.

6. The tank according to claim 1, wherein a ratio between a diameter of each of the at least one metal reinforcing rod and an external diameter of the corresponding one of the at least one electrically insulating tube is between 0.1 and 0.6.

7. The tank according to claim 1, further comprising a spacer set up to hold each of the at least one metal reinforcing rod in place coaxially with the corresponding one of the at least one electrically insulating tube.

8. The tank according to claim 1, wherein the corresponding one of at least one electrically insulating tube is surrounded by an insulating disc-shaped splitter, the insulating disc-shaped splitter extending radially in a plane inclined with respect to a longitudinal axis of the corresponding one of at least one electrically insulating tube.

9. The tank according to claim 1, wherein one axial end of each of the corresponding one of the at least one electrically insulating tube is in contact with a first one of at least one insulating disc-shaped splitter, the first one of the at least one insulating disc-shaped splitter extending radially in a plane inclined with respect to a longitudinal axis of the corresponding one of the at least one electrically insulating tube.

10. The tank according to claim 9, wherein an opposing axial end of each of the corresponding one of the at least one electrically insulating tube is in contact with a second one of the at least one insulating disc-shaped splitter.

11. The tank according to claim 1, wherein each of the at least one metal reinforcing rod is connected to the two of the uprights of the structure by nuts.

12. A tank for a medium-voltage electrical unit that is intended to contain a gas under a pressure greater than atmospheric pressure, the tank comprising:

a structure that has uprights, panels that are secured to the uprights, the panels being set up to receive a pressure force of the pressurized gas, at least one metal reinforcing rod, each of the at least one metal reinforcing rod extending in a longitudinal direction, the at least one metal reinforcing rod connecting together two of the uprights so as to counter a deformation of the uprights under the action of the pressure force of the pressurized gas, at least one set of electrically insulating tubes, wherein at least one longitudinal portion of each of the at least one metal reinforcing rod is surrounded by a corresponding one of the at least one set of electrically insulating tubes, and wherein a lateral surface of each of the at least one metal reinforcing rod is separated from an innermost surface of the corresponding one of the at least one set of electrically insulating tubes.

13. The tank according to claim 12, wherein each of the at least one metal reinforcing rod and the corresponding one of the at least one set of electrically insulating tubes are coaxial.

14. The tank according to claim 12, wherein each the at least one set of electrically insulating tubes is disposed between the two of the uprights in the longitudinal direction.

15. The tank according to claim 12, wherein the tank is set up such that each of the at least one metal reinforcing rod is separated from the innermost surface of the corresponding one of the at least one set of electrically insulating tubes by the pressurized gas.

16. The tank according to claim 12, wherein the tank is set up such that the lateral surface of each of the at least one metal reinforcing rod is separated from the innermost surface of the corresponding one of at least one set of electrically insulating tubes by an insulating foam.

17. The tank according to claim 12, further comprising a spacer set up to hold each of the at least one metal reinforcing rod in place coaxially with the corresponding one of the at least one set of electrically insulating tubes.

18. The tank according to claim 12, wherein each of the at least one set of electrically insulating tubes comprises a first electrically insulating tube and a second electrically insulating tube, wherein the second electrically insulating tube surrounds the first electrically insulating tube, wherein the second electrically insulating tube and the first electrically insulating tube are coaxial, and wherein an inner surface of the second electrically insulating tube is separated from an outer surface of the first electrically insulating tube.

19. The tank according to claim 18, wherein the inner surface of the second electrically insulating tube is separated from the outer surface of the first electrically insulating tube by the pressurized gas.

20. The tank according to claim 12, wherein one axial end of the corresponding one of the at least one set of electrically insulating tubes is in contact with a first one of at least one insulating disc-shaped splitter, the first one of the at least one insulating disc-shaped splitter extending radially in a plane inclined with respect to a longitudinal axis of the corresponding one of the at least one set of electrically insulating tubes.

21. The tank according to claim 20, wherein an opposing axial end of the corresponding one of the at least one set of electrically insulating tubes is in contact with a second one of the at least one insulating disc-shaped splitter.

22. The tank according to claim 20, wherein each of the at least one set of electrically insulating tubes comprises a first electrically insulating tube and a second electrically insulating tube, wherein the second electrically insulating tube surrounds the first electrically insulating tube, wherein the second electrically insulating tube and the first electrically insulating tube are coaxial, and wherein an inner surface of the second electrically insulating tube is separated from an outer surface of the first electrically insulating tube; and the tank further comprising at least one spacer set up to hold the first electrically insulating tube in place coaxially with the at least one metal reinforcing rod and to hold the second electrically insulating tube in place coaxially with the at least one metal reinforcing rod, wherein a respective one of the at least one spacer and a respective one of the at least one insulating disc-shaped splitter form a one-piece assembly.

23. The tank according to claim 12, wherein each of the at least one metal reinforcing rod is connected to the two of the uprights of the structure by nuts.

* * * * *